(12) United States Patent
Tinklenberg

(10) Patent No.: US 11,863,956 B2
(45) Date of Patent: Jan. 2, 2024

(54) METHODS AND SYSTEMS FOR BALANCING AUDIO DIRECTED TO EACH EAR OF USER

(71) Applicant: Sony Interactive Entertainment LLC, San Mateo, CA (US)

(72) Inventor: Bethany Tinklenberg, San Mateo, CA (US)

(73) Assignee: Sony Interactive Entertainment LLC, San Mateo, CA (US)

( * ) Notice: Subject to any disclaimer, the term of this patent is extended or adjusted under 35 U.S.C. 154(b) by 0 days.

(21) Appl. No.: 17/827,566

(22) Filed: May 27, 2022

(65) Prior Publication Data

US 2023/0388709 A1 Nov. 30, 2023

(51) Int. Cl.
*H04R 5/04* (2006.01)
*H04R 3/04* (2006.01)
*H04R 1/26* (2006.01)
*H04R 5/033* (2006.01)

(52) U.S. Cl.
CPC .............. *H04R 5/04* (2013.01); *H04R 1/26* (2013.01); *H04R 3/04* (2013.01); *H04R 5/033* (2013.01)

(58) Field of Classification Search
CPC ... H04R 5/04; H04R 1/26; H04R 3/04; H04R 5/033; H04R 1/10; H04R 2420/07
USPC ............ 381/74, 26, 309, 60, 384; 455/575.2
See application file for complete search history.

(56) References Cited

U.S. PATENT DOCUMENTS

| | | | |
|---|---|---|---|
| 8,306,250 B2* | 11/2012 | Watanabe | H04R 1/1016 381/328 |
| 8,873,766 B2* | 10/2014 | Yamamoto | H04R 29/001 381/74 |
| 10,133,544 B2* | 11/2018 | Helwani | H04R 25/40 |
| 11,589,176 B1* | 2/2023 | Khaleghimeybodi | H04R 29/001 |
| 2015/0106475 A1* | 4/2015 | Tan | H04R 5/04 709/217 |
| 2015/0172839 A1* | 6/2015 | Rung | H04R 25/70 381/60 |
| 2015/0382096 A1* | 12/2015 | Lamar | H04R 3/04 381/74 |
| 2017/0332186 A1* | 11/2017 | Riggs | H04S 3/008 |

(Continued)

FOREIGN PATENT DOCUMENTS

| | | |
|---|---|---|
| CN | 110262768 A | 9/2019 |
| CN | 112565968 A | 3/2021 |
| WO | WO 9115902 A1 | 10/1991 |

OTHER PUBLICATIONS

ISR WO PCT/US2023/067153, dated Aug. 14, 2023, 13 pages.

*Primary Examiner* — Xu Mei
(74) *Attorney, Agent, or Firm* — PENILLA IP, APC

(57) ABSTRACT

Methods and systems for providing audio to a user include retrieving aural attributes of the user and analyzing the aural attributes to detect any aural imbalance between two ears of the user. An audio generated by an interactive application is dynamically calibrated, in accordance to aural imbalance detected between the two ears of the user, to generate a calibrated audio. The audio of the interactive application is forwarded to a first side of a headphone directed toward a first ear of the user and the calibrated audio to second side of the headphone directed toward a second ear. The different audio provided via different sides of the headphone compensate for the aural imbalance detected in the user.

11 Claims, 4 Drawing Sheets

(56) References Cited

U.S. PATENT DOCUMENTS

2020/0008124 A1\* 1/2020 Gong .................. H04W 40/005
2021/0176555 A1\* 6/2021 Hoffmann .............. H03G 5/165

\* cited by examiner

METHODS AND SYSTEMS FOR BALANCING AUDIO DIRECTED TO EACH EAR OF USER

TECHNICAL FIELD

The present disclosure relates to providing audio generated by an interactive application to a user, and more particularly to providing audio to each ear of the user in accordance to aural attributes associated with each ear of the user.

BACKGROUND OF THE DISCLOSURE

With the growing popularity of video games, (i.e., interactive applications) and the growing number of video games available to users on different devices, providing appropriate feedback to the user in a timely manner becomes especially important. The video games receive game inputs from a user, update the game state, and provide game content that includes current state to the user. The game content includes game scenes and game audio. The game audio can be provided to the user through headphones or microphones associated with a game input device. When the user is fully immersed in a video game, the user may not pay much attention to or may not be aware of the real-world environment conditions in the vicinity of the user. The user may interact with the video game using a controller or other input devices. Oftentimes, the user may be suffering from aural imbalance between their two ears and may not be able to fully hear or distinguish the audio provided to each ear.

Additionally, the user may interact with the video game using a head mounted display (HMD). The HMD is used to provide game input, render game scenes of the video game on a display screen of the HMD, and to provide audio related to game play to the user. The HMD may be configured to muffle or completely block the sound from the real-world environment to allow the user to have a totally immersive game experience. When the user with hearing imbalance uses the HMD to interact with the video game and receive game content, the user may not only hear the game audio properly in each ear but also a sound generated by a person or an animal or an object moving toward the user in the real-world environment (e.g., opening a door or their stride or talking/barking/running by a person/animal). Due to the imbalance between the ears and/or due to muffling of the sound by the HMD, the user may not fully perceive their own safety in the real-world environment. Additionally, this can lead to distraction of the user, which can affect the game play of the user.

It is in this context that embodiments of the disclosure arise.

SUMMARY

Implementations of the present disclosure relate to systems and methods used for providing audio of an interactive application to a user. Aural attributes of each ear of the user are determined and used to determine if there is any imbalance between the two ears of the user. When an imbalance is detected between the two ears, the audio provided to the user is calibrated to take into account the perceived imbalance between the two ears, and the appropriate audio (i.e., unadjusted audio or adjusted audio) is forwarded to each ear of the user. The audio forwarded to each ear is in accordance to the aural attributes determined for each ear. The user generally uses headphones to listen to the audio and the appropriate audio is directed toward each side of the headphone to allow the user to hear the audio clearly.

In some cases, an aural test (e.g., audiometry test) may be conducted to determine the aural attributes of each ear of the user. The aural attributes determined from the aural test may be stored in a user profile of the user and used every time the user is to be provided with audio from an interactive application. In some other cases, the user may themselves provide the aural attributes of each ear as part of custom settings defined by the user for an interactive application. In yet other cases, the aural attributes provided by the user may be used to verify the aural attributes of each ear of the user as determined from the aural test, and the results of the verification may be used in adjusting the audio provided to the user.

The various implementations thus are used to determine hearing capability of each ear of the user, detect any imbalance in the hearing capability between the two ears of the user, and when hearing imbalance is detected, calibrate audio directed toward each ear of the user. The calibration of the audio may include modulating volume, pitch, etc., and/or filtering some of the content that would bother or irritate the user. Providing variable audio to each ear of the user enables the user to hear the audio accurately, enhancing their video game experience. A person who is hard of hearing can have a reduced volume or lower pitch audio directed to one ear and increased volume or higher pitch in the other ear.

In one implementation, a method for providing audio to a user is disclosed. The method includes retrieving aural attributes of the user in response to detecting the user selecting an interactive application for interaction. The interactive application generates the audio that is rendered to the user along with interactive content. The aural attributes are analyzed to detect an aural imbalance between the two ears of the user. The audio provided by the interactive application is dynamically calibrated in accordance to the aural imbalance detected between the two ears, to generate a calibrated audio. The audio is forwarded to a first side of a headphone directed toward a first ear of the user and the calibrated audio is forwarded to a second side of the headphone directed toward a second ear of the user. The calibrated audio directed to the second ear compensates for the aural balance detected between the two ears of the user to enable the user to accurately hear the audio provided by the interactive application.

In an alternate implementation, a method for providing audio to a user is disclosed. The method includes detecting selection of an interactive application for interaction by a user. The interactive application generating the audio for providing to the user. Responsive to selection of the interactive application, an aural test is dynamically conducted to determine aural attributes of each ear of the user. The aural attributes of the user determined for each ear of the user is stored in a user profile of the user. The aural attributes of each ear are analyzed to detect an aural imbalance between the two ears of the user. The audio of the interactive application is dynamically calibrated to generate a calibrated audio, based on the aural imbalance detected between the two ears of the user. The audio generated by the interactive application is forwarded to a first side of a headphone directed toward a first ear and the calibrated audio is forwarded to a second side of the headphone directed toward a second ear of the user. The calibrated audio compensates for the aural imbalance detected between the two ears of the user to enable the user to accurately hear the audio provided by the interactive application.

Other aspects and advantages of the disclosure will become apparent from the following detailed description, taken in conjunction with the accompanying drawings, illustrating by way of example the principles of the disclosure.

BRIEF DESCRIPTION OF THE DRAWINGS

The disclosure may best be understood by reference to the following description taken in conjunction with the accompanying drawings.

DETAILED DESCRIPTION

Figure 1:
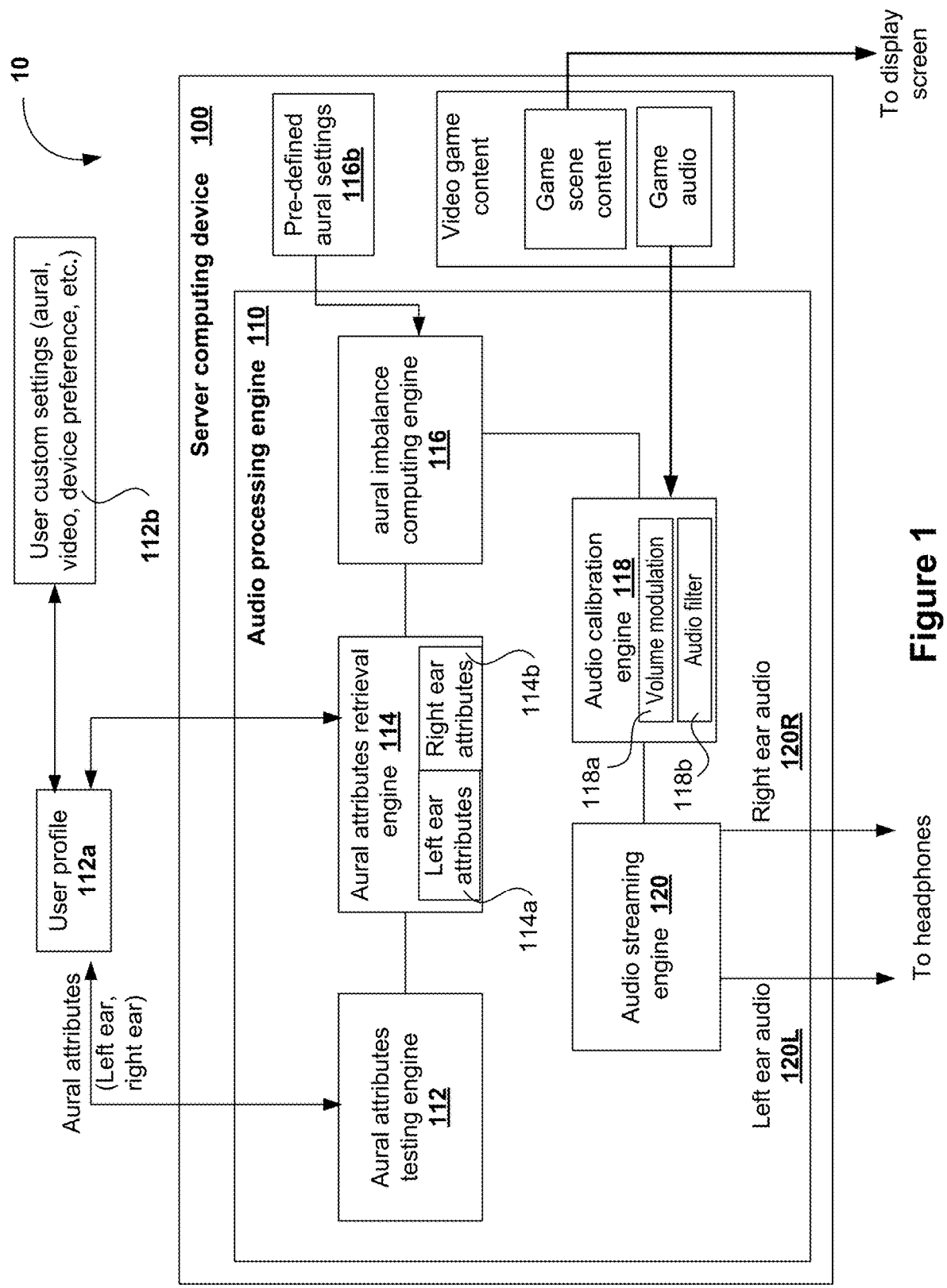
FIG. 1 provides a simplified block diagram of a system used to provide audio generated by an interactive application to a user, in accordance with one implementation of the present disclosure.

In the following description, numerous specific details are set forth in order to provide a thorough understanding of the present disclosure. It will be apparent, however, to one skilled in the art that the present disclosure may be practiced without some or all of these specific details. In other instances, well known process steps have not been described in detail in order not to obscure the present disclosure.

With the growing number of interactive applications (e.g., video games), providing proper game content to the user in a timely manner is important to allow the user to have an enriching game play experience of the video game. The game content includes game scenes and game audio associated with the game scenes of the video game. The game scenes are rendered on a display screen of a client device, such as a head mounted display (HMD), a television monitor, a display screen or a display surface associated with a computing device. The game audio is provided through speakers embedded within a headphone worn by the user, wherein the headphones are part of the client device (e.g., HMD or the controller or the computing device) that was used for interacting with the video game. Sounds from the real-world environment in which the user is present are captured by microphones embedded within the computing device, the HMD and/or the controller, and provided to the interactive application or the user or to the system to provide additional warnings to the user.

The user may have distinct aural attributes identifying hearing capabilities of each ear of the user. In some cases, the aural attributes of the user's left ear can be distinctly different from the aural attributes of the user's right ear. In such cases, there can be aural imbalance (i.e., listening handicap) in the hearing of the user. As previously noted, the aural attributes and the aural imbalance can be determined by conducting an aural test of the user. The aural test can be conducted every time the user selects the interactive application, such as the video game, for interaction. Alternately, the aural test may be conducted during an initial setup of the interactive application (e.g., a video game) or the system (e.g., computing device, controller, and/or HMD) used by the user for interacting with the video game. The results from the aural test identifying the aural attributes of each ear of the user can be stored in a user profile of the user and used whenever the user wants to play the video game. By determining the imbalance between the two ears of the user, the audio generated by the video game (e.g., game audio) can be dynamically adjusted to compensate for the aural imbalance so that the user can accurately hear the audio provided through each ear of the user.

An amount of adjustment that needs to be done to any audio to compensate for any aural imbalance detected between the two ears of the user can also be stored in the user profile of the user. The aural attributes of each ear, the aural imbalance between the two ears, and the amount of adjustment that needs to be done to the audio directed toward a specific ear can also be stored in the system as user's system settings. Maintaining the aural attributes and the aural imbalance as part of the system settings enables applying the user's aural settings across all interactive applications and use environments of the user in the system.

In some implementations, the aural attributes of each ear of the user can be provided as input settings by the user. In some implementations, the system can rely just on the input settings provided by the user and not perform any aural test. In alternate implementations, the aural attributes from the input settings provided by the user can be verified against the aural test results. This additional verification step can be used to ensure that the aural settings provided by the user represent the current hearing capability of the user. The audio of the interactive application is provided to the user in accordance to the current aural settings of the user. In some implementations, the aural attributes are used to modulate the sound forwarded via the headphones to each ear of the user, for example. Alternately, certain sounds that would bother or irritate one or both ears of the user can be identified and filtered out and the remaining sounds can be forwarded to each ear of the user in accordance to the respective ear's aural settings. Instead of filtering out certain sounds, certain sounds may be filtered-in into the audio provided to the user. For example, sound generated by a person or a pet or an object moving toward the user from the right side may be filtered into the game audio provided to the right ear so as to notify the user that the person, pet or the object is approaching the user from the right side. In this example, the audio provided to the left ear can be unadjusted audio.

With the general understanding of the disclosure, specific examples will be described with reference to the various drawings.

FIG. 1 illustrates a simplified block diagram of an example system 10 that includes a server computing device (or simply referred to herein as a "server") 100 that is employed to execute an audio processing engine 110, in accordance to various implementations of the disclosure. The server 100 can be an independent server computing device or be a part of a network of server computing devices or can be part of a cloud system or can be a virtual computing device. The server 100 is coupled to a plurality of client devices (not shown) over a network (not shown), such as the Internet. The audio processing engine 110 can be stored in a memory of the server or available to the server and executed by a processor of the server. The audio processing engine 110 includes a plurality of components that are used to determine aural attributes of a user and to process any audio that is provided to the user in accordance to the determined aural attributes. The aural attributes of the user can be determined by conducting an aural test on the user. Alternately, the aural attributes may be provided by the user as part of user's system settings. When aural attributes are provided by the user, the aural attributes determined from the aural test can be verified against the aural attributes provided by the user to confirm the current aural settings of the user.

Toward this end, some of the components included in the audio processing engine 110 include an aural attributes testing engine 112, an aural attributes retrieval engine 114, an aural imbalance computing engine 116, an audio calibration engine 118 and an audio streaming engine 120. The aforementioned components are provided as mere example and should not be considered exhaustive or limiting. The audio processing engine 110 can include fewer or additional components to determine the aural attributes of the user and to process the audio presented to the user.

The audio processing engine 110 engages the aural attributes testing engine 112 to conduct an aural test of each ear of the user. The aural attributes testing engine 112 can employ any standard or customized testing device, process or mechanism to determine the aural attributes of each ear of the user. In some implementations, the aural test is performed every time the user accesses the server 100 for selecting an interactive application, such as the video game, for interaction (i.e., game play). In alternate implementations, the aural test can be performed once during the initial setup of the video game or the system and the results of the aural test stored in a user profile 112a of the user for subsequent retrieval and use. The user profile 112a thus can be used to separately store the aural attributes of the left ear and the right ear of the user.

In addition to or instead of performing the aural test, the aural attributes can be provided by the user and stored as custom settings 112b. The custom settings 112b provided by the user, in some implementations, can be stored in the user profile 112a of the user or in a separate system settings datastore (not shown) and retrieved for subsequent use. The aural attributes of the user provided in the custom settings can be applied across a plurality of applications or use environments. In addition to the aural attributes, the custom settings provided by the user can include device preferences (i.e., which device to use for providing inputs to a video game, which device to use for receiving content, which device to use for rendering content, which device to use for communicating with other users, etc.), video preferences, content preferences, etc. The device preferences can encompass more than one device, wherein each device used by the user is coupled to the server 100 to allow the device to be used for interaction with the video game and/or for receiving game related content. The aural attributes include the attributes of both the right and the left ears of the user.

The aural attributes retrieval engine 114 is engaged to retrieve the aural attributes of the user. In the case where the aural attributes of the user are determined by conducting aural test every time the user accesses the server 100 for interacting with the video game, the aural attributes of the user are obtained dynamically by performing the aural test in real-time. The dynamically determined aural attributes are provided as input to the aural attributes retrieval engine 114. In the case where the aural testing was conducted during prior interactive sessions or during initial setup of the system 10 or the video game (i.e., interactive application), the aural settings are obtained by querying the user profile of the user. The aural attributes retrieval engine 114 initiates the query to the user profile 112a of the user or system settings (not shown) of the user to obtain the aural attributes of the user stored therein. As noted, the aural attributes of the user include the left ear attributes 114a and the right ear attributes 114b, and are used to determine the hearing capabilities of each ear of the user. The hearing capability of the right ear of the user can be same or different from the hearing capability of the left ear. In the case where the hearing capability of the right ear of the user is different from the left ear, the user may be experiencing hearing handicap. Similarly, the hearing capabilities of the user can be same as or different from that of a plurality of other users. In the cases where the user has hearing handicap, the audio provided to the one or both ears of the user need to be adjusted to allow the user to accurately hear the audio. Details of the aural handicap and/or the aural attributes are forwarded to the aural imbalance computing engine 116.

The aural imbalance computing engine 116 is engaged to analyze the aural attributes of the user either retrieved from the user profile 112a, or the custom settings (112b), or provided by the aural attributes testing engine 112, and to determine if the user has an aural imbalance between their two ears. To determine the aural imbalance, the aural imbalance computing engine 116 compares the aural attributes of the left ear against the corresponding aural attributes of the right ear and when there is a difference between the two, the user can be declared to have hearing imbalance (i.e., listening handicap). Further, the aural imbalance computing engine 116 can compare the aural attributes of each ear (i.e., left and the right ears) against corresponding aural attributes defined in a pre-defined aural setting to determine which ear exhibits normal attributes and which ear has a listening handicap. The aural attributes included in the pre-defined aural settings may define a base level for normal hearing. If no difference is detected between the attributes of the two ears, and between the attributes of each ear and the pre-defined aural settings, the system 10 may declare that the user does not have a listening handicap. Alternately, there may not be any difference detected between the aural attributes of the two ears. However, there may be a difference between the aural attributes of each ear and the corresponding aural attributes included in the pre-defined aural settings. In such a case, it may be declared that the user has a listening handicap.

The audio calibration engine 118 is engaged to calibrate audio provided to the user. The audio calibration engine 118 receives the game audio from the video game (i.e., audio of an interactive application) and the results of the aural imbalance computation from the aural imbalance computing engine 116. When it is determined that the user has a listening handicap (i.e., aural imbalance), the audio calibration engine 118 is used to adjust the game audio provided to the user, in accordance to the aural attributes associated with each ear of the user, to generate calibrated game audio. The amount of adjustment that has to be made to the game audio may depend on the extent of aural imbalance detected for the user. In some implementations, the calibrated game audio may be generated for one ear (i.e., either left or right) or for both ears or for each ear based on the aural imbalance or aural handicap detected for the user. In the case where the video game is a streaming video game and the game audio is being streamed in real-time, the adjustment to the game audio is also done in real-time to generate calibrated game audio stream. In some implementations, the calibrated game audio is generated by modulating volume 118a, pitch or other attribute of the game audio. In some implementations, the calibrated game audio is further adjusted by filtering out certain portions or types of audio included in the game audio that may bother or irritate one ear or both ears of the user. The adjustment to the calibrated game audio is done by selectively applying one or more audio filter(s) (118b). The resulting calibrated game audio generated for one or both ears of the user is in accordance to the aural attributes and/or custom settings specified by the user.

Although the various implementations are discussed with reference to using game audio and adjusting game audio, the implementations can be extended to include other audio, such as music, podcast, videos, etc., generated outside of the video game. For instance, the aural settings for rendering/adjusting the game audio can be imported from aural test conducted outside of the video game or from custom settings provided by the user for the other media. Similarly, the in-game aural settings determined from the aural test conducted using game audio, for example, may be exported to other applications and used for rendering audio outside of the video game. As noted, the aural settings can be saved in the user profile of the user or in the system settings defined by the user and used for rendering in-game and outside-game audio. The aural settings of the user can be used for rendering audio via headphones (e.g., wired or wireless) that are coupled to computing devices or embedded within a head mounted display (HMD) worn by the user. The HMD can be used for interacting with content, such as music, media content (movies, videos (streaming or pre-recorded), user-generated content, etc.), game content, social media content, podcasts, etc.

Continuing to refer to FIG. 1, the game audio and the calibrated game audio generated for one or both ears of the user are forwarded to the audio streaming engine 120. The audio streaming engine 120 identifies the game audio or the calibrated game audio that has to be provided to each ear and forwards (e.g., streams) the relevant game audio to the appropriate side of the headphones worn by the user so that the user can accurately hear the game audio streamed to the respective ear. For example, it may be determined that the left ear of the user is impaired (i.e., hard of hearing) while the right ear of the user is normal (i.e., unimpaired). In some implementations, the term "normal" may mean that the user's hearing capacity is at par with what is defined in the pre-defined aural settings. Based on this determination, the audio streaming engine 120 provides the calibrated game audio to the left ear 120L of the user and the game audio to the right ear 120R of the user. Consequently, the calibrated game audio is streamed to the left side speaker of the headphone worn by the user and the game audio is forwarded to the right side speaker of the headphone. In addition to the game audio, the video game also generates video content of game scenes. The video content is forwarded to a display screen or display surface for rendering. The display screen or display surface is identified by querying the user profile or system settings defined by the user. The display screen thus can be associated with a client device (e.g., display screen of a HMD or a TV monitor or a monitor of a computing device or a display screen of a mobile computing device).

Figure 2A:
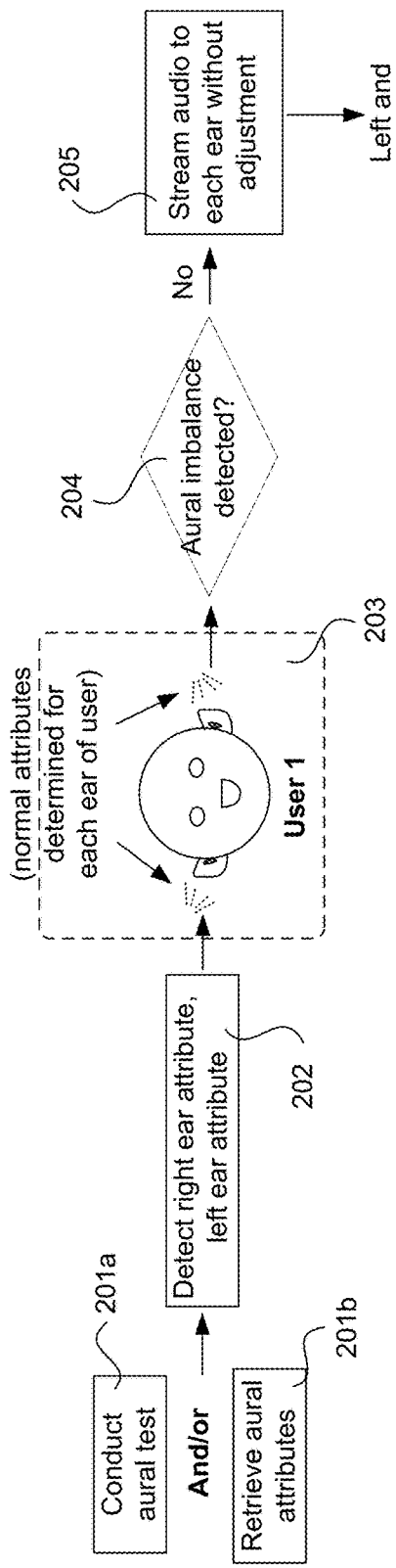
FIG. 2A illustrates a data flow diagram followed for providing audio generated by an interactive application, in accordance with one implement of the present disclosure.
Figure 2B:
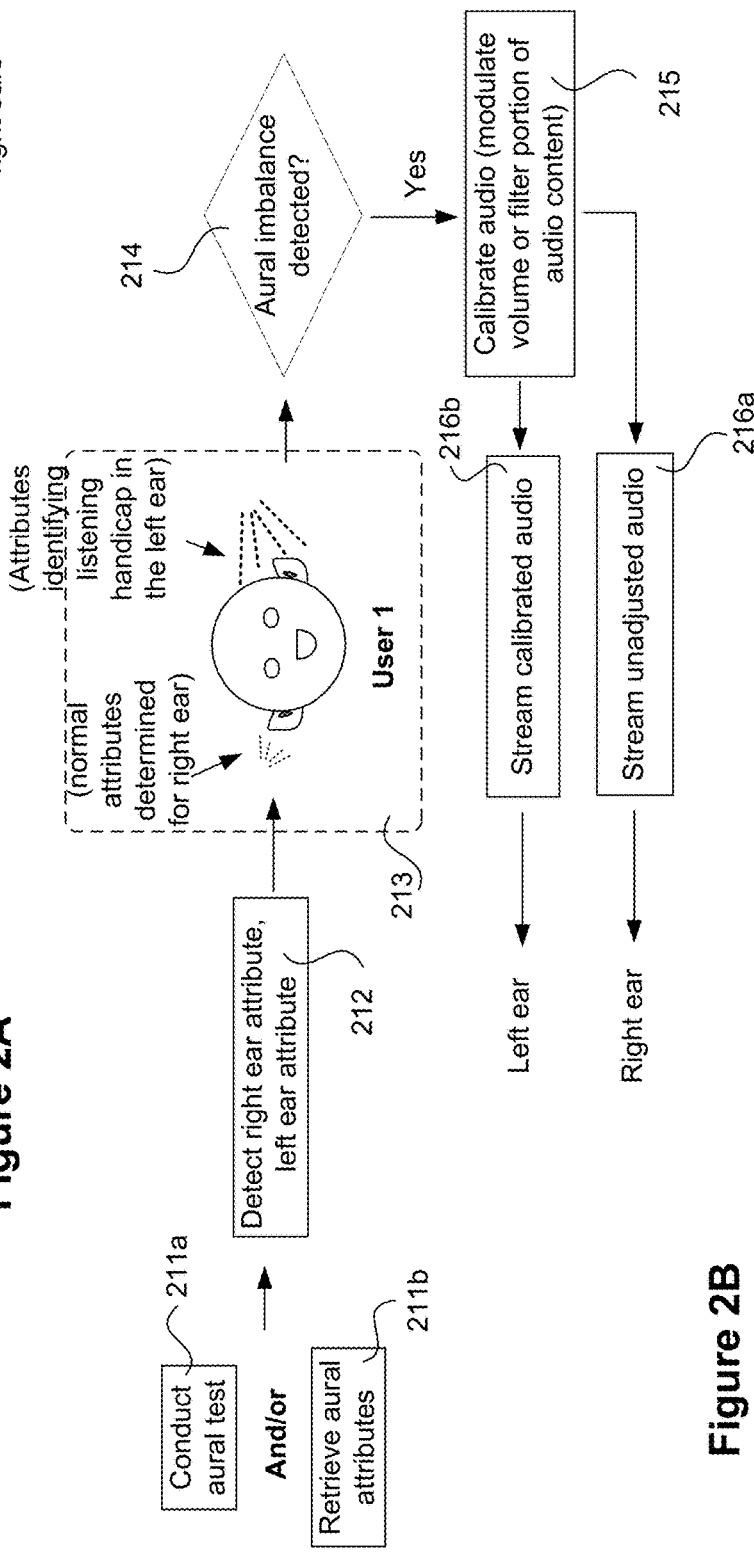
FIG. 2B illustrates a data flow diagram followed for providing audio generated by an interactive application, in accordance with an alternate implement of the present disclosure.

FIGS. 2A and 2B show examples of data flow followed by the system 10 for providing the audio content generated by a video game or other interactive application selected for interaction by the user, in some implementations. FIG. 2A illustrates the data flow where no aural imbalance is detected between the two ears of the user and the user has normal hearing, in one implementation and FIG. 2B illustrates the data flow when an aural imbalance is detected between the two ears of the user and the user has listening handicap.

As shown in FIG. 2A, the data flow begins by obtaining aural attributes of the user. The aural attributes can be obtained by conducting an aural test 201a for the user. The aural test (e.g., audiometry test) can be conducted using any known or customized device, process or mechanism. The aural test is conducted separately for each ear of the user. In addition to or in place of conducting an aural test 201a, the aural attributes of the user can be retrieved (201b) from a user profile or from system settings provided by the user. When the aural attributes are retrieved from the user profile, the retrieved aural attributes is used to verify the aural attributes obtained from the aural test to define current aural settings for the user. The current aural settings identify the left ear attributes and the right ear attributes 202. The left and the right ear attributes are analyzed to determine the hearing capability of the user. In the implementation illustrated in FIG. 2A, it is determined that the left and the right ear attributes are equal 203. Further, the user is declared to have normal hearing, based on the comparison of the aural attributes of the user against the corresponding aural attributes included in the pre-defined aural settings, wherein the pre-defined aural settings include aural settings identifying normal hearing as well as various levels of hearing impairments. In some implementations, the pre-defined aural settings may be defined based on age of the user. In alternate implementations, the pre-defined aural settings are age-agnostic.

The left and the right ear attributes are analyzed to determine if there is an aural imbalance detected between the two ears of the user, which can be used to determine if the user has hearing impairment. Thus, the left and the right ear attributes are analyzed to determine the hearing capability of the user. In the implementation illustrated in FIG. 2A, a decision point is reached at operation 204, where the left ear attributes are compared against the corresponding right ear attributes, and each ear's attributes with corresponding aural attributes specified in the pre-defined aural settings to determine if there is an aural imbalance between the two ears of the user and whether the user is experience hearing impairment. The process proceeds to operation 205, wherein the audio from the interactive application, such as game audio from the video game, is streamed to both ears of the user. Since the user is shown to not have any hearing impairment, the game audio is forwarded to each ear (i.e., left and the right ears) of the user without adjusting any attributes.

FIG. 2B illustrates an alternate data flow diagram, wherein the user is determined to have hearing impairment, in one implementation. The data flow begins at 211a where aural attributes are obtained for the user. The aural attributes of each ear of the user can be obtained by conducting an aural test for the user. In some implementations, the aural test may be conducted when no aural attributes are available for the user at the server 100. Alternately, the aural test may be conducted every time the user accesses the server 100 to select and play a video game executing at the server or at another server that is communicatively connected to the server 100. In other alternate implementations, the aural attributes of the user may be retrieved (211b) from a user profile or system settings. The aural attributes can be provided by the user as part of custom settings that are saved as system settings so that these system settings can be applied across different applications (i.e., video games, other interactive applications) or use environment. The user provided aural settings are retrieved in response to detecting the user selecting a video game for interacting. In the case where the aural test is conducted and aural attributes are also provided by the user, the aural attributes provided by the user can be used to further verify the aural attributes determined from the aural test so as to define the current aural settings.

The aural attributes identify right ear and left ear attributes (212). Attributes of each ear are then analyzed to determine if the right ear attributes is same as the left ear attributes (213). Based on the analysis, it is determined that the right ear of user exhibits normal attributes and the left ear is shown to have attributes that suggest that the user has listening handicap (i.e., an aural imbalance). Once the left and the right ears aural attributes of the user are determined, the left ear attributes are compared against the right ear attributes to determine if there is any aural imbalance between the two ears (214). Additionally, the left and the right ear attributes are also compared against corresponding aural attributes included in pre-defined aural settings. Based on the comparison, it may be determined that there is an aural imbalance between the two ears of the user. In response to detecting the aural imbalance of the user, audio that is directed to the user is calibrated to generate calibrated audio (215). For instance, game audio of a video game generated in response to receiving inputs from the user is calibrated to generate calibrated game audio. The calibrated game audio is generated by modulating volume, pitch, etc., or by filtering out some portion of the game audio that does not meet the user's aural settings or that bothers or irritates the user's ear or ears. In some implementations, instead of filtering out certain sounds, the calibrated game audio can be generated by filtering in special sounds, wherein the special sound included in the calibrated game audio is identified based on context of the video game, safety of the user during the user's interaction in the video game, location of the user in relation to the real-world objects in the vicinity of the user. The calibrated game audio outputs sound that compensates for the imbalance. For example, if a person is approaching the user from the left, the sound corresponding to or representative of the person approaching the user is included in either the game audio or the calibrated game audio so that the user interacting with the video game can be made aware of the person approaching the user. In some implementations, depending on the direction from which the person is approaching the user, the filtering in of the special sound may be done to either the game audio or the calibrated game audio that is being provided to the ear that is in the direction of the person approaching the user.

The calibrated game audio can be generated for one ear, or for both ears, or separately for each ear of the user. The calibrated game audio for one, both or each ear of the user is generated based on aural attributes of each ear and based on aural imbalance detected between the two ears of the user. For example, the calibrated game audio can be generated for both ears or for each ear of the user, when it is determined that the aural attributes of each ear or both ears of the user vary from the corresponding attributes defined in the pre-defined aural settings. Alternately, the calibrated game audio can be generated for one ear of the user, when it is determined that the one ear has hearing impairment and the other ear does not have any hearing impairment. In the implementation where the video game is a streaming video game, the game audio is streamed real-time. In this implementation, the calibrated game audio is generated and streamed in real-time. When it is determined that the left ear of the user has hearing impairment and the right ear does not, the game audio 216a that is unadjusted is streamed to a right side of a headphone providing audio to the right ear and the calibrated game audio 216b is streamed to the left side of the headphone providing audio to the left ear of the user. The streaming of the game audio and the calibrated game audio to different ears of the user compensates for the aural imbalance between the two ears so as to allow the user to hear the game audio accurately thereby enriching the user's game play experience.

Figure 3:
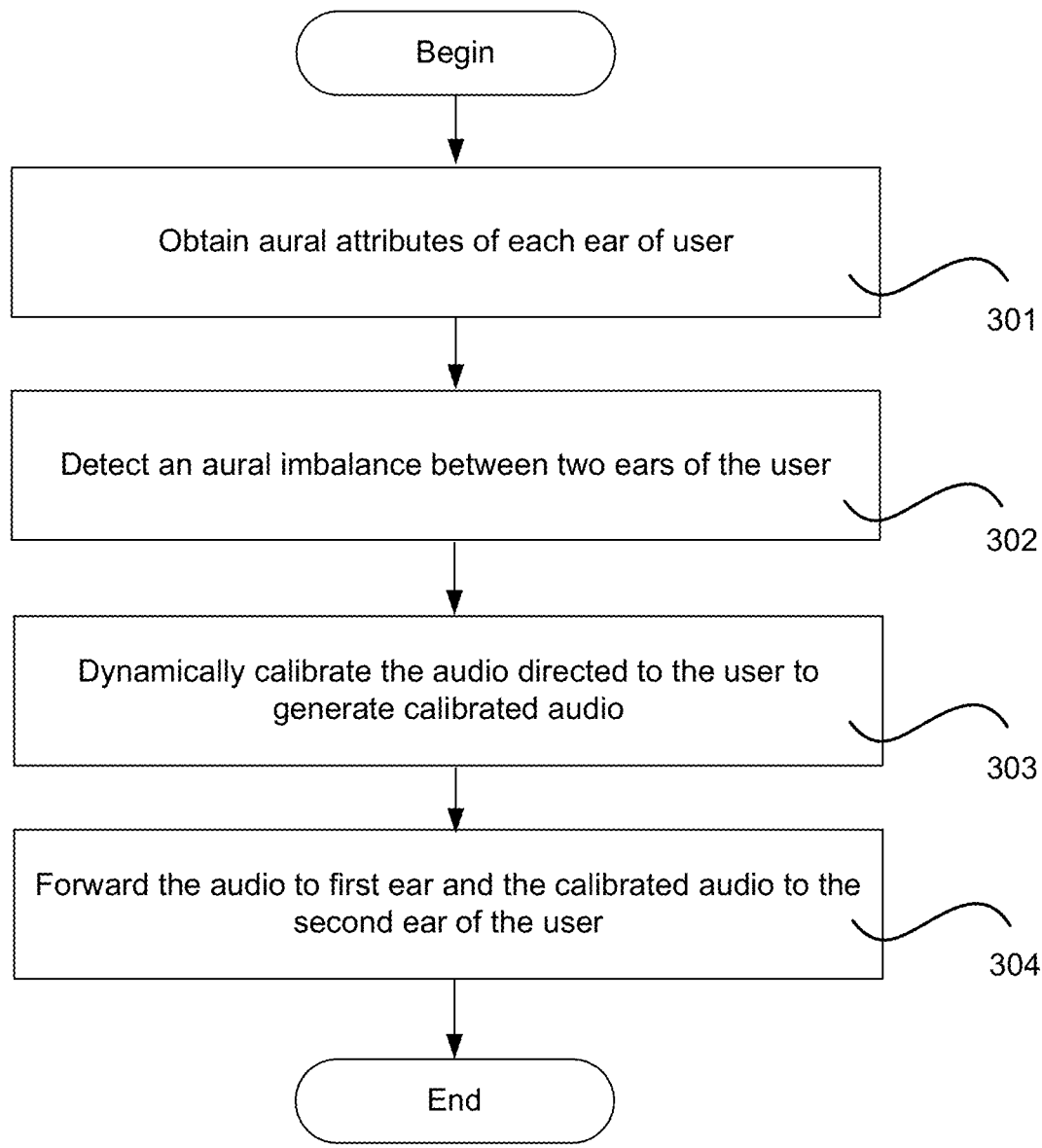
FIG. 3 illustrates a simplified flow of operations of a method for verifying an input provided at a controller for an interactive application, in accordance with one implementation of the present disclosure.

FIG. 3 illustrates flow of operations of a method for providing audio of an interactive application, such as a video game, to a user in accordance with one implementation of the disclosure. The method starts at operation 301 wherein aural attributes associated with each ear of the user are obtained by the system, in response to detecting selection of the video game for game play by the user. The video game receives game input from the user and provides game content for rendering to the user. The game content includes game video and game audio. The aural attributes are provided by the user or determined from an aural test conducted for the user. The aural attributes of the user are analyzed to determine if any aural imbalance exists between the two ears of the user, as illustrated in operation 302. When there is an aural imbalance detected between the two ears of the user, the game audio generated by the video game and provided for the user is dynamically calibrated to generate calibrated game audio, as illustrated in operation 303. The user wears a headphone to listen to the audio generated by the video game. The unadjusted game audio is forwarded to a first side of the headphone directed toward a first ear (e.g., right ear) of the user while the calibrated game audio is forwarded to a second side of the headphone that is directed toward a second ear (e.g., right ear), which is shown to have the hearing impairment, as illustrated in operation 304. The calibrated game audio forwarded to the ear with the hearing impairment can have reduced or increased volume or pitch, to enable more accurate hearing.

Although various implementations discussed herein are described with reference to calibrating game audio of a video game provided to a user, the implementations can be extended to cover calibrating any audio generated by any other interactive application that is provided (e.g., streamed) to the user. The various implementations thus provide ways to detect listening handicap in a user and to adjust sound (i.e., audio) output by an interactive application (e.g., video game) to each side of a headphone used by the user to listen to the generated audio. The adjusted audio compensates for the detected hearing imbalance of the user so that the user can listen to the audio accurately.

Figure 4:
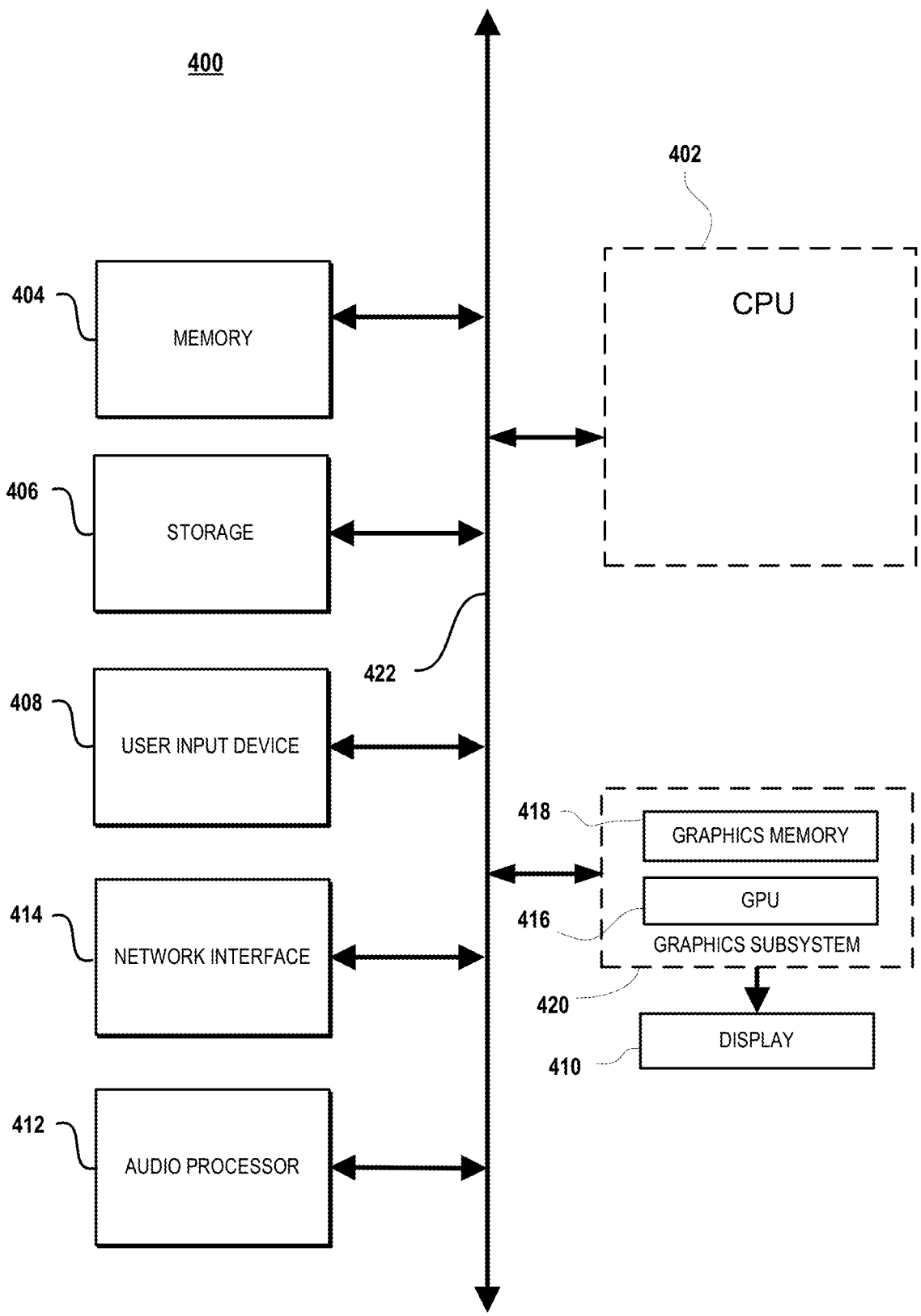
FIG. 4 illustrates components of an example computing device that can be used to perform aspects of the various implementations of the present disclosure.

FIG. 4 illustrates components of an example server device 400 that can be used to perform aspects of the various embodiments of the present disclosure. This block diagram illustrates the server device 400 that can incorporate or can be a personal computer, video game console, personal digital assistant, a head mounted display (HMD), a wearable computing device, a laptop or desktop computing device, a server or any other digital computing device, suitable for practicing an embodiment of the disclosure. The server device (or simply referred to as "server" or "device") 400 includes a central processing unit (CPU) 402 for running software applications and optionally an operating system. CPU 402 may be comprised of one or more homogeneous or heterogeneous processing cores. For example, CPU 402 is one or more general-purpose microprocessors having one or more processing cores. Further embodiments can be implemented using one or more CPUs with microprocessor architectures specifically adapted for highly parallel and computationally intensive applications, such as processing operations of interpreting a query, identifying contextually relevant resources, and implementing and rendering the contextually relevant resources in a video game immediately. Device 400 may be localized to a player playing a game segment (e.g., game console), or remote from the player (e.g., back-end server processor), or one of many servers using virtualization in a game cloud system for remote streaming of game play to client devices.

Memory 404 stores applications and data for use by the CPU 402. Storage 406 provides non-volatile storage and other computer readable media for applications and data and may include fixed disk drives, removable disk drives, flash memory devices, and CD-ROM, DVD-ROM, Blu-ray, HD-DVD, or other optical storage devices, as well as signal transmission and storage media. User input devices 408 communicate user inputs from one or more users to device 400, examples of which may include keyboards, mice, joysticks, touch pads, touch screens, still or video recorders/cameras, tracking devices for recognizing gestures, and/or microphones. Network interface 414 allows device 400 to communicate with other computer systems via an electronic communications network, and may include wired or wireless communication over local area networks and wide area networks such as the internet. An audio processor 412 is adapted to generate analog or digital audio output from instructions and/or data provided by the CPU 402, memory 404, and/or storage 406. The components of device 400, including CPU 402, memory 404, data storage 406, user input devices 408, network interface 414, and audio processor 412 are connected via one or more data buses 422.

A graphics subsystem 420 is further connected with data bus 422 and the components of the device 400. The graphics subsystem 420 includes a graphics processing unit (GPU) 416 and graphics memory 418. Graphics memory 418 includes a display memory (e.g., a frame buffer) used for storing pixel data for each pixel of an output image. Graphics memory 418 can be integrated in the same device as GPU 416, connected as a separate device with GPU 416, and/or implemented within memory 404. Pixel data can be provided to graphics memory 418 directly from the CPU 402. Alternatively, CPU 402 provides the GPU 416 with data and/or instructions defining the desired output images, from which the GPU 416 generates the pixel data of one or more output images. The data and/or instructions defining the desired output images can be stored in memory 404 and/or graphics memory 418. In an embodiment, the GPU 416 includes 3D rendering capabilities for generating pixel data for output images from instructions and data defining the geometry, lighting, shading, texturing, motion, and/or camera parameters for a scene. The GPU 416 can further include one or more programmable execution units capable of executing shader programs.

The graphics subsystem 420 periodically outputs pixel data for an image from graphics memory 418 to be displayed on display device 410. Display device 410 can be any device capable of displaying visual information in response to a signal from the device 400, including CRT, LCD, plasma, and OLED displays. In addition to display device 410, the pixel data can be projected onto a projection surface. Device 400 can provide the display device 410 with an analog or digital signal, for example.

It should be noted, that access services, such as providing access to games of the current embodiments, delivered over a wide geographical area often use cloud computing. Cloud computing is a style of computing in which dynamically scalable and often virtualized resources are provided as a service over the Internet. Users do not need to be an expert in the technology infrastructure in the "cloud" that supports them. Cloud computing can be divided into different services, such as Infrastructure as a Service (IaaS), Platform as a Service (PaaS), and Software as a Service (SaaS). Cloud computing services often provide common applications, such as video games, online that are accessed from a web browser, while the software and data are stored on the servers in the cloud. The term cloud is used as a metaphor for the Internet, based on how the Internet is depicted in computer network diagrams and is an abstraction for the complex infrastructure it conceals.

A game server may be used to perform the operations of the durational information platform for video game players, in some embodiments. Most video games played over the Internet operate via a connection to the game server. Typically, games use a dedicated server application that collects data from players and distributes it to other players. In other embodiments, the video game may be executed by a distributed game engine. In these embodiments, the distributed game engine may be executed on a plurality of processing entities (PEs) such that each PE executes a functional segment of a given game engine that the video game runs on. Each processing entity is seen by the game engine as simply a compute node. Game engines typically perform an array of functionally diverse operations to execute a video game application along with additional services that a user experiences. For example, game engines implement game logic, perform game calculations, physics, geometry transformations, rendering, lighting, shading, audio, as well as additional in-game or game-related services. Additional services may include, for example, messaging, social utilities, audio communication, game play/replay functions, help function, etc. While game engines may sometimes be executed on an operating system virtualized by a hypervisor of a particular server, in other embodiments, the game engine itself is distributed among a plurality of processing entities, each of which may reside on different server units of a data center.

According to this embodiment, the respective processing entities for performing the operations may be a server unit, a virtual machine, or a container, depending on the needs of each game engine segment. For example, if a game engine segment is responsible for camera transformations, that particular game engine segment may be provisioned with a virtual machine associated with a graphics processing unit (GPU) since it will be doing a large number of relatively simple mathematical operations (e.g., matrix transformations). Other game engine segments that require fewer but more complex operations may be provisioned with a processing entity associated with one or more higher power central processing units (CPUs).

By distributing the game engine, the game engine is provided with elastic computing properties that are not bound by the capabilities of a physical server unit. Instead, the game engine, when needed, is provisioned with more or fewer compute nodes to meet the demands of the video game. From the perspective of the video game and a video game player, the game engine being distributed across multiple compute nodes is indistinguishable from a non-distributed game engine executed on a single processing entity, because a game engine manager or supervisor distributes the workload and integrates the results seamlessly to provide video game output components for the end user.

Users access the remote services with client devices, which include at least a CPU, a display and I/O. The client device can be a PC, a mobile phone, a netbook, a PDA, etc. In one embodiment, the network executing on the game server recognizes the type of device used by the client and adjusts the communication method employed. In other cases, client devices use a standard communications method, such as html, to access the application on the game server over the internet.

It should be appreciated that a given video game or gaming application may be developed for a specific platform and a specific associated controller device. However, when such a game is made available via a game cloud system as presented herein, the user may be accessing the video game with a different controller device. For example, a game might have been developed for a game console and its associated controller, whereas the user might be accessing a cloud-based version of the game from a personal computer utilizing a keyboard and mouse. In such a scenario, the input parameter configuration can define a mapping from inputs which can be generated by the user's available controller device (in this case, a keyboard and mouse) to inputs which are acceptable for the execution of the video game.

In another example, a user may access the cloud gaming system via a tablet computing device, a touchscreen smartphone, or other touchscreen driven device. In this case, the client device and the controller device are integrated together in the same device, with inputs being provided by way of detected touchscreen inputs/gestures. For such a device, the input parameter configuration may define particular touchscreen inputs corresponding to game inputs for the video game. For example, buttons, a directional pad, or other types of input elements might be displayed or overlaid during running of the video game to indicate locations on the touchscreen that the user can touch to generate a game input. Gestures such as swipes in particular directions or specific touch motions may also be detected as game inputs. In one embodiment, a tutorial can be provided to the user indicating how to provide input via the touchscreen for gameplay, e.g., prior to beginning gameplay of the video game, so as to acclimate the user to the operation of the controls on the touchscreen.

In some embodiments, the client device serves as the connection point for a controller device. That is, the controller device communicates via a wireless or wired connection with the client device to transmit inputs from the controller device to the client device. The client device may in turn process these inputs and then transmit input data to the cloud game server via a network (e.g., accessed via a local networking device such as a router). However, in other embodiments, the controller can itself be a networked device, with the ability to communicate inputs directly via the network to the cloud game server, without being required to communicate such inputs through the client device first. For example, the controller might connect to a local networking device (such as the aforementioned router) to send to and receive data from the cloud game server. Thus, while the client device may still be required to receive video output from the cloud-based video game and render it on a local display, input latency can be reduced by allowing the controller to send inputs directly over the network to the cloud game server, bypassing the client device.

In one embodiment, a networked controller and client device can be configured to send certain types of inputs directly from the controller to the cloud game server, and other types of inputs via the client device. For example, inputs whose detection does not depend on any additional hardware or processing apart from the controller itself can be sent directly from the controller to the cloud game server via the network, bypassing the client device. Such inputs may include button inputs, joystick inputs, embedded motion detection inputs (e.g., accelerometer, magnetometer, gyroscope), etc. However, inputs that utilize additional hardware or require processing by the client device can be sent by the client device to the cloud game server. These might include captured video or audio from the game environment that may be processed by the client device before sending to the cloud game server. Additionally, inputs from motion detection hardware of the controller might be processed by the client device in conjunction with captured video to detect the position and motion of the controller, which would subsequently be communicated by the client device to the cloud game server. It should be appreciated that the controller device in accordance with various embodiments may also receive data (e.g., feedback data) from the client device or directly from the cloud gaming server.

In one embodiment, the various technical examples can be implemented using a virtual environment via a head-mounted display (HMD). An HMD may also be referred to as a virtual reality (VR) headset. As used herein, the term "virtual reality" (VR) generally refers to user interaction with a virtual space/environment that involves viewing the virtual space through an HMD (or VR headset) in a manner that is responsive in real-time to the movements of the HMD (as controlled by the user) to provide the sensation to the user of being in the virtual space or metaverse. For example, the user may see a three-dimensional (3D) view of the virtual space when facing in a given direction, and when the user turns to a side and thereby turns the HMD likewise, then the view to that side in the virtual space is rendered on the HMD. An HMD can be worn in a manner similar to glasses, goggles, or a helmet, and is configured to display a video game or other metaverse content to the user. The HMD can provide a very immersive experience to the user by virtue of its provision of display mechanisms in close proximity to the user's eyes. Thus, the HMD can provide display regions to each of the user's eyes which occupy large portions or even the entirety of the field of view of the user, and may also provide viewing with three-dimensional depth and perspective.

In one embodiment, the HMD may include a gaze tracking camera that is configured to capture images of the eyes of the user while the user interacts with the VR scenes. The gaze information captured by the gaze tracking camera(s) may include information related to the gaze direction of the user and the specific virtual objects and content items in the VR scene that the user is focused on or is interested in interacting with. Accordingly, based on the gaze direction of the user, the system may detect specific virtual objects and content items that may be of potential focus to the user where the user has an interest in interacting and engaging with, e.g., game characters, game objects, game items, etc.

In some embodiments, the HMD may include an externally facing camera(s) that is configured to capture images of the real-world space of the user such as the body movements of the user and any real-world objects that may be located in the real-world space. In some embodiments, the images captured by the externally facing camera can be analyzed to determine the location/orientation of the real-world objects relative to the HMD. Using the known location/orientation of the HMD, the real-world objects, and inertial sensor data from the Inertial Motion Unit (IMU) sensors, the gestures and movements of the user can be continuously monitored and tracked during the user's interaction with the VR scenes. For example, while interacting with the scenes in the game, the user may make various gestures such as pointing and walking toward a particular content item in the scene. In one embodiment, the gestures can be tracked and processed by the system to generate a prediction of interaction with the particular content item in the game scene. In some embodiments, machine learning may be used to facilitate or assist in said prediction.

During HMD use, various kinds of single-handed, as well as two-handed controllers can be used. In some implementations, the controllers themselves can be tracked by tracking lights included in the controllers, or tracking of shapes, sensors, and inertial data associated with the controllers. Using these various types of controllers, or even simply hand gestures that are made and captured by one or more cameras, it is possible to interface, control, maneuver, interact with, and participate in the virtual reality environment or metaverse rendered on an HMD. In some cases, the HMD can be wirelessly connected to a cloud computing and gaming system over a network. In one embodiment, the cloud computing and gaming system maintains and executes the video game being played by the user. In some embodiments, the cloud computing and gaming system is configured to receive inputs from the HMD and the interface objects over the network. The cloud computing and gaming system is configured to process the inputs to affect the game state of the executing video game. The output from the executing video game, such as video data, audio data, and haptic feedback data, is transmitted to the HMD and the interface objects. In other implementations, the HMD may communicate with the cloud computing and gaming system wirelessly through alternative mechanisms or channels such as a cellular network.

Additionally, though implementations in the present disclosure may be described with reference to a head-mounted display, it will be appreciated that in other implementations, non-head mounted displays may be substituted, including without limitation, portable device screens (e.g. tablet, smartphone, laptop, etc.) or any other type of display that can be configured to render video and/or provide for display of an interactive scene or virtual environment in accordance with the present implementations. It should be understood that the various embodiments defined herein may be combined or assembled into specific implementations using the various features disclosed herein. Thus, the examples provided are just some possible examples, without limitation to the various implementations that are possible by combining the various elements to define many more implementations. In some examples, some implementations may include fewer elements, without departing from the spirit of the disclosed or equivalent implementations.

As noted, implementations of the present disclosure for communicating between computing devices may be practiced using various computer device configurations including hand-held devices, microprocessor systems, microprocessor-based or programmable consumer electronics, minicomputers, mainframe computers, head-mounted display, wearable computing devices and the like. Embodiments of the present disclosure can also be practiced in distributed computing environments where tasks are performed by remote processing devices that are linked through a wire-based or wireless network.

In some embodiments, communication may be facilitated using wireless technologies. Such technologies may include, for example, 5G wireless communication technologies. 5G is the fifth generation of cellular network technology. 5G networks are digital cellular networks, in which the service area covered by providers is divided into small geographical areas called cells. Analog signals representing sounds and images are digitized in the telephone, converted by an analog to digital converter and transmitted as a stream of bits. All the 5G wireless devices in a cell communicate by radio waves with a local antenna array and low power automated transceiver (transmitter and receiver) in the cell, over frequency channels assigned by the transceiver from a pool of frequencies that are reused in other cells. The local antennas are connected with the telephone network and the Internet by a high bandwidth optical fiber or wireless backhaul connection. As in other cell networks, a mobile device crossing from one cell to another is automatically transferred to the new cell. It should be understood that 5G networks are just an example type of communication network, and embodiments of the disclosure may utilize earlier generation wireless or wired communication, as well as later generation wired or wireless technologies that come after 5G.

With the above embodiments in mind, it should be understood that the disclosure can employ various computer-implemented operations involving data stored in computer systems. These operations are those requiring physical manipulation of physical quantities. Any of the operations described herein that form part of the disclosure are useful machine operations. The disclosure also relates to a device or an apparatus for performing these operations. The apparatus can be specially constructed for the required purpose, or the apparatus can be a general-purpose computer selectively activated or configured by a computer program stored in the computer. In particular, various general-purpose machines can be used with computer programs written in accordance with the teachings herein, or it may be more convenient to construct a more specialized apparatus to perform the required operations.

Although the method operations were described in a specific order, it should be understood that other housekeeping operations may be performed in between operations, or operations may be adjusted so that they occur at slightly different times or may be distributed in a system which allows the occurrence of the processing operations at various intervals associated with the processing, as long as the processing of the telemetry and game state data for generating modified game states are performed in the desired way.

One or more embodiments can also be fabricated as computer readable code on a computer readable medium. The computer readable medium is any data storage device that can store data, which can be thereafter be read by a computer system. Examples of the computer readable medium include hard drives, network attached storage (NAS), read-only memory, random-access memory, CD-ROMs, CD-Rs, CD-RWs, magnetic tapes and other optical and non-optical data storage devices. The computer readable medium can include computer readable tangible medium distributed over a network-coupled computer system so that the computer readable code is stored and executed in a distributed fashion.

Although the foregoing embodiments have been described in some detail for purposes of clarity of understanding, it will be apparent that certain changes and modifications can be practiced within the scope of the appended claims. Accordingly, the present embodiments are to be considered as illustrative and not restrictive, and the embodiments are not to be limited to the details given herein, but may be modified within the scope and equivalents of the appended claims.

It should be understood that the various embodiments defined herein may be combined or assembled into specific implementations using the various features disclosed herein. Thus, the examples provided are just some possible examples, without limitation to the various implementations that are possible by combining the various elements to define many more implementations. In some examples, some implementations may include fewer elements, without departing from the spirit of the disclosed or equivalent implementations.

The invention claimed is:

1. A method for providing audio to a user, comprising:
retrieving aural attributes of the user, upon detecting selection of an interactive application for interaction by the user, the interactive application generating the audio for rendering to the user;
analyzing the aural attributes to detect an aural imbalance between two ears of the user;
dynamically calibrating the audio provided to the user to generate a calibrated audio for the interactive application, based on aural imbalance detected between the two ears of the user; and
forwarding the audio to a first side of a headphone directed toward a first ear of the user and the calibrated audio to a second side of the headphone directed toward a second ear of the user, the headphone used to provide the audio to the user, the calibrated audio directed to the second ear compensating for the aural imbalance detected between the two ears of the user so as to allow the user to accurately hear the audio provided by the interactive application,
wherein operations of the method are performed by a processor of a system.

2. The method of claim 1, wherein the aural attributes are stored in a user profile of the user and retrieved in response to detecting the selection of the interactive application by the user.

3. The method of claim 1, wherein the aural attributes are provided by the user as part of user aural settings and retrieved in response to detecting the selection of the interactive application by the user.

4. The method of claim 1, wherein the aural attributes are determined by automatically conducting an aural test for the user, in response to detecting the selection of the interactive application by the user, the aural test used to determine aural attributes of each ear of the user, the aural attributes stored in a user profile of the user and retrieved to determine the aural imbalance between the two ears of the user.

5. The method of claim 4, wherein the aural attributes of said each ear of the user determined from the aural test are verified against corresponding aural attributes defined in aural settings provided for said each ear by the user, the aural settings provided by the user is stored in the user profile of the user alongside the aural attributes determined for the user.

6. The method of claim 1, wherein dynamic calibrating includes modulating a volume directed toward each ear of the user, such that the audio directed toward said each ear meets the aural attributes of said each ear.

7. The method of claim 1, wherein dynamic calibrating includes filtering out certain portion of the audio to generate the calibrated audio that is directed toward said first ear of the user when said audio in said certain portion does not meet the aural attributes of said first ear.

8. The method of claim 7, wherein the audio provided to said second ear continues to render said certain portion of the audio, when said certain portion of the audio meets the aural attributes of said second ear.

9. A method for balancing audio provided to a user, comprising:
detecting selection of an interactive application for interaction by the user, the interactive application generating the audio for providing to the user;
dynamically conducting an aural test to determine aural attributes of each ear of the user, responsive to the selection of the interactive application, the aural attributes of said each ear of the user stored in a user profile of the user;
analyzing the aural attributes of each ear to detect an aural imbalance between two ears of the user;
dynamically calibrating the audio of the interactive application provided to the user to generate a calibrated audio, based on the aural imbalance detected between the two ears of the user; and
forwarding the audio generated by the interactive application to a first side of a headphone toward a first ear of the user and the calibrated audio to a second side of the headphone directed toward a second ear of the user, the headphone used by the user to hear the audio, the calibrated audio directed to the second ear compensates for the aural imbalance detected between the two ears of the user so as to allow the user to accurately hear the audio,
wherein operations of the method are performed by a processor of a system.

10. The method of claim 9, wherein the aural attributes stored in the user profile of the user shared with other interactive applications selected by the user for interaction, the sharing allowing the audio generated by the other interactive applications to be provided to the user in accordance to the aural attributes so as to allow more accurate hearing of the audio of the other interactive applications.

11. The method of claim 9, wherein the aural attributes determined for each ear of the user is verified against corresponding aural attributes for said each ear provided in aural settings by the user, the aural settings for said each ear stored in the user profile of the user alongside corresponding aural attributes of said each ear.

* * * * *